United States Patent Office 3,644,414
Patented Feb. 22, 1972

3,644,414
1-SUBSTITUTED-3-PHENYLPYRROLIDINES
Grover Cleveland Helsley, Richmond, Va., assignor to
A. H. Robins Company, Incorporated, Richmond, Va.
No Drawing. Filed Apr. 11, 1969, Ser. No. 815,495
Int. Cl. C07d 27/04
U.S. Cl. 260—326.3                            4 Claims

ABSTRACT OF THE DISCLOSURE 1-substituted-3-phenylpyrrolidines useful as muscle relaxants and anticonvulsants are disclosed. The compounds are prepared from 3-phenylpyrrolidines.

---

The present invention relates to certain novel heterocyclic compounds which may be referred to as 3-phenylpyrrolidines and is more particularly concerned with 1-substituted-3-phenylpyrrolidines.

The compounds of the present invention may be expressed generally by the following formula:

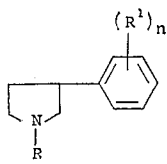

Formula I wherein;

R is selected from amino, amidino, carbamoyl, N-phenylcarbamoyl, N,N-diphenylcarbamoyl, N-lower alkyl-N-phenylcarbamoyl, N-lower alkyl thiocarbamoyl, hydrazinocarbonyl, lower alkynyl, 1,4-benzodioxan-2-yl-lower alkyl, 1,2,3,4-tetrahydro-1-quinolylcarbonyl, and 1-indolinylcarbonyl, $R^1$ is selected from lower alkyl, lower alkoxy, trifluoromethyl, and halogen of atomic weight less than eighty, n is a positive integer from 0–2 inclusive, and Non-toxic acid addition salts thereof.

The compounds of the invention are useful because of their pharmacological action on the central nervous system. The activity is demonstratable when the compounds are used in the form of the free base or in the form of their non-toxic acid addition salts. The preferred form of the compounds is as their non-toxic acid addition salts for increased water solubility and ease of administration. No. 75445 Rampmeyer, C. M. 1–28–72 Day Mach. 58

The compounds of the present invention have demonstrated utility as muscle relaxants and anticonvulsants as determined in animals by recognized pharmacological procedures. In particular, among the novel compounds disclosed herein the compound of Example 3, 1-phenylcarbamoyl-3-(3-trifluoromethylphenyl)pyrrolidine is preferred as a muscle relaxant. It has demonstrated marked muscle relaxant properties when tested according to the principles of the flexor reflex technique of Carroll, M. N. et al., Arch. Int. Pharmacodyn, CXXX, No. 3–4, 280 (1961), at an intravenous dose in cats of about 5–100 mg./kg. and preferably at a dose of 5–50 mg./kg. The anticonvulsant properties of the novel compounds of the present invention were demonstrated in cats using the supramaximal electroshock seizure technique of Toman, J. E. P. et al., J. Neurophysiol. 9, 47(1946). The anticonvulsant activity was elicited at a dose level of 25–200 mg./kg. intravenously, the preferred dose level being 25–125 mg./kg. Among the novel compounds tested, those of Examples 1, 3, and 12, 1-carbamoyl-3-(3-trifluoromethylphenyl)pyrrolidine, 1 - phenylcarbamoyl-3-(3-trifluoromethylphenyl)pyrrolidine, and 1-(N-methylthiocarbamoyl)-3-(3-trifluoromethylphenyl)pyrrolidine are preferred for their marked anticonvulsant activity.

It is, therefore, an object of this invention to provide novel 1-substituted-3-phenylpyrrolidines useful as muscle relaxants and anticonvulsants. Another object is to provide methods for producing the novel compounds, pharmaceutical compositions containing the same, and methods for their utilization. Other objects and advantages of this invention will be apparent to one skilled in the art and still other objects will become apparent hereafter.

In the definition of symbols in the foregoing Formula I and where they appear elsewhere throughout this specification the terms have the following significance.

"Lower-alkyl" as used herein includes straight and branched chain radicals of up to eight carbon atoms inclusive and is exemplified by such groups as methyl, ethyl, propyl, isopropyl, tertiary butyl, amyl, isoamyl, hexyl, heptyl, octyl, and the like. "Lower-alkoxy" has the formula —O—lower-alkyl. The term "lower alkynyl" includes straight and branched chain radicals of two up to eight carbon atoms inclusive and is exemplified by such groups as propynyl, butynyl, pentynyl, and hexynyl.

"Phenyl" includes the unsubstituted phenyl radical and phenyl radicals substituted by any radical or radicals which are not reactive or otherwise interfering under the conditions of the reaction, such as lower alkyl, trifluoromethyl, lower alkoxy and halogen having an atomic weight less than eighty. The substituted phenyl radicals have preferably no more than one to three substituents such as those given above and, furthermore, these substituents can be in various available positions of the phenyl nucleus and where more than one substituent is present can be the same or different and can be in various position combinations relative to each other. The lower-alkyl and lower alkoxy substituents each have preferably from one to three carbon atoms which can be arranged as straight or branched chains.

This invention also includes acid addition salts of the above defined bases of Formula I formed with non-toxic organic and inorganic acids. Such salts are easily prepared by methods known in the art. When the compounds are to be used as intermediates for preparing other compounds or for any other nonpharmaceutical use, the toxicity or non-toxicity of the salt is immaterial; when the compounds are to be used as pharmaceuticals, they are most conveniently used in the form of non-toxic acid addition salts. Both toxic and non-toxic salts are therefore within the purview of the invention. The acids which can be used to prepare the preferred non-toxic acid addition salts are those which produce, when combined with the free bases, salts whose anions are relatively innocuous to the animal organism in therapeutic doses of the salts, so that beneficial physiological properties inherent in the free bases are not vitiated by side effects ascribable to the anions.

The base is reacted with the calculated amount of organic or inorganic acid in aqueous miscible solvent, such as ethanol or isopropanol, with isolation of the salt by concentration and cooling, or the base is reacted with an excess of the acid in aqueous immiscible solvent such as ethyl ether or isopropyl ether, with the desired salt separating directly. Exemplary of such organic salts are those formed with maleic, fumaric, benzoic, ascorbic, pamoic, succinic, tartaric, citric, lactic, itaconic, p-aminobenzoic, stearic acid and the like. Exemplary of such inorganic salts are those prepared using hydrochloric, hydrobromic, sulfuric, sulfamic, phosphoric and nitric acids.

The starting materials for the process of the present invention are the appropriately substituted 3-phenyl-3-pyrrolidinols which are prepared by methods described in U.S. Pat. 2,878,264. Thus, 1-benzyl-3-pyrrolidinone in ether is reacted with a phenylmagnesium halide. Hydrolysis of the reaction mixture with an aqueous alkaline solution such as 50 percent sodium hydroxide gives the corresponding 1-benzyl-3-phenyl-3-pyrrolidinol. The benzyl group is removed by hydrogenolysis.

The following Chart I illustrates the process of the invention and shows the various procedures involved in preparing the novel 1-substituted -3-phenylpyrrolidines. In Chart I, all the symbols have the values previously assigned.

CHART I

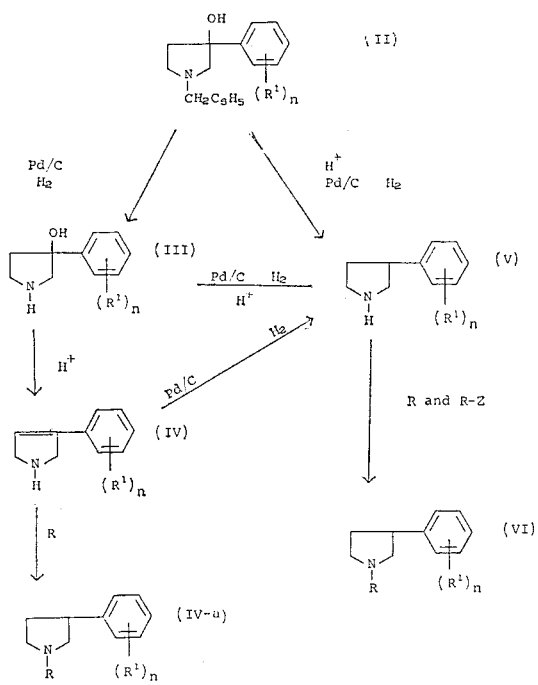

R and $R^1$ have the values previously assigned and Z is a halogen atom, preferably chlorine.

As shown in Chart I, a 1-benzyl-3-phenyl-3-pyrrolidinol (II) may be converted directly to a 3-phenylpyrrolidine (V) by reduction in an acid medium in the Paar hydrogenator. The 1-benzyl-3-phenyl-3-pyrrolidinol is dissolved in absolute alcohol containing a mineral acid as, for example, hydrochloric acid and a noble metal catalyst, and the solution is shaken in one to three atmospheres of hydrogen at a temperature of from about 20° C. to about 70° C. The preferred catalyst is palladium (5–20%) on charcoal and in an amount of from about 3–10% by weight of the 1-benzyl-3-phenyl-3-pyrrolidinol. The 3-phenyl-pyrrolidines (V) are isolated from the cooled reaction mixture and purified by distillation or by conversion to an acid addition salt.

When a mineral acid is omitted from the reaction mixture hereinabove, the 1-benzyl-3-phenyl-3-pyrrolidinols are catalytically debenzylated to 3-phenyl-3-pyrrolidinols (III). The 3-phenyl-3-pyrrolidinols (III) are converted to 3-phenyl-pyrrolidines (V) by dehydration and reduction in an acidic medium using similar conditions to those given hereinabove.

Another aspect of the present invention is shown in Chart I, wherein a 3-phenyl-3-pyrrolidinol (III) intermediate is dehydrated in a concentrated mineral acid as, for example, hydrochloric acid, for a period of from about ten to about twenty hours, preferably at reflux temperature, to give 3-phenyl-3-pyrrolines (IV). The 3-phenyl-3-pyrrolines are catalytically reduced in the Paar hydrogenator to 3-phenylpyrrolidines of Formula V.

Starting materials such as the 3-(halosubstituted-phenyl)pyrrolidines are preferably prepared by lithium aluminum hydride reduction of α-halophenylsuccinimides according to methods described by Welstead et al., J. Med. Chem., 10: 1015(1967). The α-halophenylsuccinimides are prepared by the synthetic methods described by C. A. Miller et al., J.A.C.S. 73 4895 and 5610(1951).

The novel compounds of Formula I and in particular the 1-carbamoyl, 1-thiocarbamoyl and 1-amidino compounds which are more fully disclosed hereinatfer are prepared from the 3-phenyl-pyrrolidine intermediates by reacting them with nitrourea, lower alkyl isothiocyanates, phenyl isocyanates, N,N-diphenyl carbamoyl halides, 2-methyl-2-thiopseudourea and the like. The reactions are generally run at or about room temperature in dry non-reactive organic solvents as, for example, benzene, toluene, xylene, ethanol, chloroform, and the like. When nitrourea is used as one of the reactants, refluxing conditions are generally employed. When a 3-phenylpyrrolidine is reacted with a disubstituted carbamoyl halide, an acid binding agent as, for example, sodium or potassium carbonate, is generally used. The 1-carbamoyl-3-phenylpyrrolidines are isolated from the mixture by filtration and concentration of the solvent and the solid residue is crystallized from a suitable solvent. The 3-phenyl-3-pyrrolines of Formula IV may be treated in a similar manner hereinabove to give 1-carbamoyl-3-phenyl-3-pyrrolines of Formula IV-a.

Additional novel compounds within the scope of Formula I are prepared by reacting 3-phenylpyrrolidines with lower-alkynyl halides, 2-halo-lower-alkyl-1,4-benzodioxanes, 1-halocarbonyl-1,2,3,4-tetrahydroquinolines, 1-halocarbonylindolines, and the like. The reactions are generally run in a solvent inert to the reactants at ambient to reflux temperature of the solvent used and in the presence of an acid acceptor as, for example, an alkali metal or an alkaline-earth metal carbonate. The products are isolated by conventional laboratory techniques including distillation, crystallization and the like.

Other novel compounds corresponding to Formula I may be prepared by treating 3-phenylpyrrolidines with phosgene. The reaction is carried out under anhydrous conditions in an inert solvent such as toluene or benzene and in the presence of an acid acceptor such as triethylamine. The thus formed 1-chlorocarbonyl-3-phenylpyrrolidines are reacted with compounds such as hydrazine, aniline, N-lower-alkyl-anilines, diphenylamine, and the like, to give novel compounds of Formula I. The reaction is usually run in a solvent mixture such as methylene chloride-ether or benzene at ambient to reflux temperature of the solvent used and in the presence of an acid acceptor such as pyridine. The products are isolated and purified by crystallization or chromatography.

Novel compounds of the invention having an amino substituent in the 1-position of the pyrrolidine moiety are prepared by nitrosation of an appropriate 3-phenylpyrrolidine. An equimolar amount of sodium nitrite dissolved in water is added to the 3-phenylpyrrolidine and the reaction mixture is heated at about 60° C. to 80° C. for a period of from about one to three hours. The crude product is extracted into benzene and the extracts are concentrated to an oil. The residual oil is dissolved in ether and reduced with lithium aluminum hydride. The product is isolated and purified by crystallization or conversion to an acid addition salt.

The following preparations and examples are given by way of illustration only and are in no event to be construed as limiting.

PREPARATION I.—3-PHENYLPYRROLIDINE OXALATE

A mixture of 62.6 g. (0.25 mole) of 1-benzyl-3-phenyl-3-pyrrolidinol, 100 ml. of concentrated hydrochloric acid and 200 ml. of absolute ethanol containing 10 g. of 10% palladium-on-charcoal catalyst was shaken in a hydrogen atmosphere at 70° C. until two equivalents of hydrogen were absorbed (6 hours). The cooled suspension was filtered and concentrated. The residual oil was basified with 50% sodium hydroxide solution and extracted with benzene. The combined benzene extracts were washed with water, dried over magnesium sulfate and the solvent evaporated. The oil was distilled at reduced pressure and the fraction boiling at 126–128° C./20 mm. collected. The colorless, non-viscous oil which weighed 17.5 g. (48% yield) was dissolved in isopropanol and converted to the oxalate salt which melted at 135.5–138° C.

*Analysis.*—Calculated for $C_{12}H_{15}NO_4$ (percent): C, 60.74; H, 6.37; N, 5.91. Found (percent): C, 60.73; H, 6.28; N, 5.81.

Utilizing the procedure of Preparation I, the following starting materials are prepared:

3-(4-methoxyphenyl)pyrrolidine.—1-benzyl - 3 - (4-methoxyphenyl)-3-pyrrolidinol dissolved in concentrated hydrochloric acid and absolute ethanol is catalytically debenzylated, dehydrated and reduced to give 3-(4-methoxyphenyl)pyrroldinie.

3-(3-fluorophenyl)pyrrolidine.—1-benzyl - 3-(3-fluorophenyl-3-pyrrolidinol is catalytically debenzylated, dehydrated and reduced in the Paar hydrogenator to give 3-(3-fluorophenyl)pyrrolidine.

3-(2,4-dimethylphenyl)pyrrolidine.—1 - benzyl-3-(2,4-dimethylphenyl)-3-pyrrolidinol is catalytically debenzylated, dehydrated and reduced in the Paar hydrogenator to give 3-(2,4-dimethylphenyl)pyrrolidine.

PREPARATION II.—3-(3-TRIFLUOROMETHYL-PHENYL)PYRROLIDINE HYDROCHLORIDE

A solution of 11.5 g. (0.05 mole) of 3-(3-trifluoromethylphenyl)-3-pyrrolidinol in 200 ml. of 6 N hydrochloric acid containing 4 g. of 10% palladium-on-charcoal catalyst was shaken in a hydrogen atmosphere at 70° C. until one equivalent of hydrogen was absorbed (about 5 hours). The cooled suspension was filtered and made basic with 50% sodium hydroxide solution. The oil which separated was extracted with ether, the combined ether extracts were washed with water, dried over magnesium sulfate and the solvent was evaporated. The non-viscous residual oil which weighed 7.1 g. (65% yield) was converted to the hydrochloride salt which was crystallized from isopropanol-isopropyl ether and melted at 111–113° C.

*Analysis.*—Calculated for $C_{11}H_{13}ClNF_3$ (percent): C, 52.49; H, 5.21; N, 5.57. Found (percent): C, 52.34; H, 5.28; N, 5.54.

PREPARATION III.—3-(3-TRIFLUOROMETHYL-PHENYL)-3-PYRROLIDINOL

A solution of 16.1 g. (0.05 mole) of 1-benzyl-3-(3-trifluoromethylphenyl)-3-pyrrolidinol in 200 ml. of ethanol containing 5 g. of 10% palladium-on-charcoal catalyst was shaken in a hydrogen atmosphere until one equivalent of hydrogen was absorbed. The cooled suspension was filtered and concentrated. The residual oil which crystallized on cooling was recrystallized from a benzene-isooctane mixture. The white compound melted at 84.5–87° C. and weighed 8.1 g. (70% yield).

*Analysis.*—Calculated for $C_{11}H_{12}F_3NO$ (percent): C, 57.14; H, 5.23; N, 6.06. Found (percent): C, 57.05; H, 5.07; N, 6.19.

PREPARATION IV.—3-(3-TRIFLUOROMETHYL-PHENYL)-3-PYRROLINE HYDROCHLORIDE

A solution of 30 g. of 3-(3-trifluoromethylphenyl)-3-pyrrolidinol in 50 ml. of concentrated hydrochloric acid was refluxed 16 hours. The crystalline product which separated on cooling was separated by filtration, dried, and recrystallized from an isopropyl ether-isopropanol mixture. The white crystalline product weighed 14.1 g. (51% yield) and melted at 214–216° C.

*Analysis.*—Calculated for $C_{11}H_{11}ClF_3N$ (percent): C, 52.92; H, 4.44; N, 5.16. Found (percent): C, 53.04; H, 4.46; N, 5.62.

Example 1.—1-carbamoyl-3-(3-trifluoromethylphenyl) pyrrolidine

A mixture of 5.4 g. (0.025 mole) of 3-(3-trifluoromethylphenyl)pyrrolidine, 3.7 g. (0.035 mole) of nitrourea and 50 ml. of 95% ethanol was stirred and heated at 60° C. until the evolution of gas ceased. The solvent was evaporated and the crystalline residue was recrystallized from an isopropyl ether-ethyl acetate mixture. The white product weighed 2.5 g. (30% yield) and melted at 126.5–128° C.

*Analysis.*—Calculated for $C_{12}H_{13}N_2OF_3$ (percent): C, 55.81; H, 5.09; N, 10.85. Found (percent): C, 55.91; H, 5.29; N, 10.89.

Example 2.—1-carbamoyl-3-phenylpyrrolidine

Using the procedure of Example 1, 3-phenylpyrrolidine and nitrourea were reacted to give 1-carbamoyl-3-phenylpyrrolidine. The product which was crystallized from an ethyl acetate-isopropyl ether mixture weighed 2.2 g. (63% yield) and melted at 123.5–125° C.

*Analysis.*—Calculated for $C_{11}H_{14}N_2O$ (percent): C, 69.45; H, 7.41; N, 14.46. Found (percent): C, 69.07; H, 7.43; N, 14.70.

Example 3.—1-phenylcarbamoyl-3-(3-trifluoromethylphenyl)pyrrolidine

To a stirred solution of 2.2 g. (0.01 mole) of 3-(3-trifluoromethylphenyl)pyrrolidine in 20 ml. of benzene at 20° C. was added slowly a solution of 1.2 g. (0.01 mole) of phenyl isocyanate in 15 ml. of dry benzene. The reaction mixture was stirred two hours at ambient temperature and the solvent was evaporated at reduced pressure. The residual oil was crystallized from an isopropyl ether-isooctane mixture. The compound melted at 111.5–113.5° C. and weighed 2.4 g. (71% yield).

*Analysis.*—Calculated for $C_{18}H_{17}F_3N_2O$ (percent): C, 64.66; H, 5.13; N, 8.38. Found (percent): C, 64.46; H, 5.08; N, 8.69.

Example 4.—1-phenylcarbamoyl-3-phenylpyrrolidine

Using the procedure of Example 3, 3-phenylpyrrolidine was reacted with phenyl isocyanate to give 1-phenylcarbamoyl-3-phenylpyrrolidine which weighed 1.8 g. (65% yield) and melted at 140–142° C.

*Analysis.*—Calculated for $C_{17}H_{18}N_2O$ (percent): C, 76.66; H, 6.81; N, 10.52. Found (percent): C, 76.47; H, 6.84; N, 10.46.

Example 5.—1-(3-chlorophenylcarbamoyl)-3-phenylpyrrolidine

To a stirred solution of 1.0 g. (0.007 mole) of 3-phenylpyrrolidine in 75 ml. of dry benzene was added slowly a solution of 1.1 g. (0.007 mole) of 3-chlorophenyl isocyanate in 25 ml. of dry benzene at room temperature. The reaction mixture was stirred an additional hour at ambient temperature and the solvent was evaporated at reduced pressure. The residual oil which crystallized on trituration with isooctane was recrystallized from a benzene-isooctane mixture yielding 1.6 g. (76%) of white product melting at 128–130° C.

*Analysis.*—Calculated for $C_{17}H_{17}ClN_2O$ (percent): C, 67.89; H, 5.70; N, 9.31. Found (percent): C, 67.95; H, 5.69; N, 9.16.

Example 6.—1-(3-trifluoromethylphenylcarbamoyl)-3-phenylpyrrolidine

Using the procedure of Example 5, 3-phenylpyrrolidine was reacted with 3-trifluoromethylphenyl isocyanate to give 1-(3-trifluoromethylphenylcarbamoyl)-3-phenylpyrrolidine which weighed 1.7 g. (68% yield) and melted at 110–112° C. after crystallization from isopropyl ether.

*Analysis.*—Calculated for $C_{18}H_{17}F_3N_2O$ (percent): C, 64.66; H, 5.13; N, 8.38. Found (percent): C, 64.59; H, 5.11; N, 8.41.

Utilizing the procedures of Examples 1–6, the following compounds are prepared from the stated ingredients:

1 - carbamoyl - 3 - (4 - fluorophenyl)pyrrolidine is prepared by reacting 3-(4-fluorophenyl)pyrrolidine and nitrourea;

1 - (phenylcarbamoyl) - 3 - (2,4 - dimethylphenyl) pyrrolidine is prepared by reacting 3-(2,4-dimethylphenyl) pyrrolidine and phenylisocyanate;

1 - (diphenylcarbamoyl) - 3 - (3 - chlorophenyl)pyrrolidine is prepared by reacting 3-(3-chlorophenyl)pyrrolidine and diphenylcarbamoylchloride.

Example 7.—1-carbamoyl-3-(3-trifluoromethylphenyl)-3-pyrroline

A mixture of 2.0 g. (0.01 mole) of 3-(3-trifluoromethylphenyl)-3-pyrroline, 1.3 g. (0.012 mole) of nitrourea and 50 ml. of 95% ethanol was warmed at about 60° C. until the evolution of gas ceased. The mixture was refluxed 15 minutes, cooled, and the solvent evaporated at reduced pressure. The oil which crystallized on standing was recrystallized from an isopropyl ether-ethyl acetate mixture yielding 1.3 g. of white product (51% yield) melting at 143–146° C.

Analysis.—Calculated for $C_{12}H_{11}F_3N_2O$ (percent): C, 65.06; H, 4.55; N, 8.43. Found (percent): C, 65.17; H, 4.58; N, 8.46.

Example 8.—1-phenylcarbamoyl-3-(3-trifluoromethylphenyl)-3-pyrroline

To a stirred solution of 1.5 g. (0.007 mole) of 3-(3-trifluoromethylphenyl)-3-pyrroline in 75 ml. of dry benzene was added slowly a solution of 0.95 g. (0.008 mole) of phenylisocyanate in 25 ml. of dry benzene. The reaction mixture was stirred at ambient temperature one hour and the solvent was evaporated at reduced pressure. The oil which crystallized on cooling was recrystallized from an isopropyl ether-benzene mixture yielding 1.8 g. (77%) of product melting at 152–155° C.

Analysis.—Calculated for $C_{18}H_{15}F_3N_2O$ (percent): C, 65.06; H, 4.55; N, 8.43. Found (percent): C, 65.17; H, 4.58; N, 8.46.

Example 9.—1-methylcarbamoyl-3-(3-trifluoromethylphenyl)-3-pyrroline

To a stirred solution of 2.9 g. (0.0014 mole) of 3-(3-trifluoromethylphenyl)-3-pyrroline in 75 ml. of dry benzene was added slowly a solution of 0.9 g. (0.014 mole) of methyl isocyanate in 25 ml. of dry benzene. The mixture was stirred at room temperature one hour and the solvent was evaporated at reduced pressure. The residual oil which crystallized on standing was recrystallized from a benzene-isooctane mixture yielding 1.6 g. (42%) of product melting at 132–135° C.

Analysis.—Calculated for $C_{13}H_{13}F_3N_2O$ (percent): C, 57.78; H, 4.85; N, 10.37. Found (percent): C, 57.10; H, 4.71; N, 10.10.

Example 10.—1-amidino-3-(3-trifluoromethylphenyl) pyrrolidine sulfate

A mixture of 4.3 g. (0.02 mole) of 3-(3-trifluoromethylphenyl)pyrroldine, 2.8 g. (0.01 mole), 2-methyl-2-thiopseudourea and 50 ml. of 50% ethanol was stirred and refluxed until the evolution of gas ceased. The white crystalline product which formed when the solution was treated with an isopropanol-isopropyl ether mixture was separated by filtration, washed with ether and recrystallized from an isopropanol-water mixture. The compound melted with decomposition at 286–288° C. and weighed 3.5 g. (57% yield).

Analysis.—Calculated for $C_{12}H_{15}F_3N_3O_2S_{1/2}$ (percent): C, 47.05; H, 4.94; N, 13.72. Found (percent): C, 47.09; H, 5.03; N, 13.74.

Example 11.—1-amidino-3-phenylpyrrolidine sulfate

A mixture of 5.9 . (0.04 mole) of 3-phenylpyrrolidine, 5.6 g. (0.02 mole) of 2-methyl-2-thiopseudourea and 50 ml. of 50% ethanol was stirred and refluxed until the evolution of gas ceased. The white crystalline product which formed when the solution was treated with 25 ml. of isopropanol was separated by filtration and washed with ether. The compound weighed 6.1 g. (64% yield) and melted above 290° C.

Analysis.—Calculated for $C_{22}H_{32}N_6O_4S$ (percent): C, 55.44; H, 6.77; N, 17.63. Found (percent): C, 55.57; H, 6.87; N, 17.07.

Example 12.—1-(N-methylthiocarbamoyl)-3-(3-trifluoromethylphenyl)pyrrolidine To a stirred solution of 2.0 g. (0.01 mole) of 3-(3-trifluoromethylphenyl)pyrrolidine in 75 ml. of dry benzene at room temperature was added slowly a solution of 0.9 g. (0.012 mole) of methyl isothiocyanate in 25 ml. of dry benzene. The reaction mixture was stirred 16 hours at room temperature and the solvent was evaporated at reduced pressure. The residual oil which crystallized on trituration with isooctane was recrystallized from an isooctane-benzene mixture yielding 1.8 g. (64%) of product melting at 100–101.5° C.

Analysis.—Calculated for $C_{13}H_{15}F_3N_2S$ (percent): C, 54.15; H, 5.24; N, 9.72. Found (percent): C, 54.17; H, 5.24; N, 9.61.

Example 13.—1-(2-propynyl)-3-(3-trifluoromethylphenyl)pyrrolidine hydrochloride To a stirred suspension of 5.4 g. (0.025 mole) of 3-(3-trifluoromethylphenyl)pyrrolidine, 10 g. of potassium carbonate and 60 ml. of absolute ethanol at 25° C. was added dropwise a solution of 3.0 g. (0.025 mole) of propargyl bromide in 20 ml. of absolute ethanol. The reaction mixture was stirred two days at room temperature, filtered, and the filtrate concentrated to an oil under reduced pressure. The free base was converted to the hydrochloride salt which was recrystallized from isopropanol-isopropyl ether, weighed 5.2 g. (72% yield) and melted at 166–170° C.

Analysis.—Calculated for $C_{14}H_{15}NF_3Cl$ (percent): C, 58.03; H, 5.22; N, 4.84. Found (percent): C, 57.84; H, 5.42; N, 4.90.

Example 14.—1-(2-propynyl)-3-phenylpyrrolidine oxalate

To a stirred suspension of 7.4 g. (0.050 mole) of 3-phenylpyrrolidine and 20 g. of potassium carbonate in 150 ml. of toluene at 25° C. was added slowly 6.5 g. (0.055 mole) of propargyl bromide in 15 ml. of toluene. The mixture was heated at 50–60° C. two hours and then stirred 16 hours at ambient temperature. The suspension was filtered and the filtrate was treated with a solution of 7.9 g. (0.070 mole) of oxalic acid dihydrate in dry ether. The white crystalline product which formed melted at 107.5–109.5° C. and weighed 6.2 g. (46% yield).

Analysis.—Calculated for $C_{15}H_{17}NO_4$ (percent): C, 65.44; H, 6.23; N, 5.09. Found (percent): C, 65.29; H, 6.30; N, 5.12.

Example 15.—1-(1,4-benzodioxan-2-ylmethyl)-3-(3-trifluoromethylphenyl)pyrrolidine A mixture of 5.3 g. (0.025 mole) of 3-(3-trifluoromethylphenyl)pyrrolidine, 4.6 g. (0.025 mole) of 2-chloromethyl-1,4-benzodioxane, 8 g. of potassium carbonate and 60 ml. of 1-butanol was stirred and refluxed seven days under an atmosphere of nitrogen. The suspension was cooled and treated with 20 ml. of water, the organic layer was separated, washed with water and the solvent was evaporated. The residual oil was distilled at reduced pressure and the fraction boiling at 147–149° C./.04 mm. was collected. The colorless, non-viscous oil weighed 4.0 g. (44% yield).

Analysis.—Calculated for $C_{20}H_{20}NO_2F_3$ (percent): C, 66.10; H, 5.55; N, 3.86. Found (percent): C, 66.21; H, 5.72; N, 3.94.

Example 16.—1-amino-3-phenylpyrrolidine oxalate

A solution of 6.0 g. (0.04 mole) of 3-phenylpyrrolidine in 3.8 ml. (0.042 mole) of 12 N hydrochloric acid was treated with 25 ml. of water and heated to 70° C. with stirring. A solution of 2.9 g. (0.042 mole) of sodium nitrite in 15 ml. of water was added slowly at a rate which maintained a temperature between 70–75° C. and the solution was stirred at 70° C. two hours. The reaction mixture was extracted with benzene, the combined benzene extracts were dried over magnesium sulfate and evaporated, yielding 4.8 g. of oil. To a suspension of 1.5 g. (0.40 mole) of lithium aluminum hydride in 70 ml. of dry ether was added a solution of the oil in 50 ml. of dry ether at a rate which maintained gentle refluxing. The mixture was stirred at room temperature 30 minutes, refluxed two hours and then stirred overnight. The mixture was cooled and treated with 3.8 ml. of ethyl acetate to decompose the excess amount of lithium aluminum hydride. The suspension was treated with 10 ml. of a saturated magnesium sulfate solution, filtered, and the solvent was evaporated at reduced pressure. The free base was converted to the oxalate salt and crystallized from isopropanol to yield 0.9 g. (9% yield) which melted at 153–154° C.

*Analysis.*—Calculated for $C_{12}H_{16}N_2O_4$ (percent): C, 57.13; H, 6.39; N, 11.10. Found (percent): C, 57.28; H, 6.39; N, 11.07.

Example 17.—3-(3-trifluoromethylphenyl)-1-(1,2,3,4-tetrahydroquinolinylcarbonyl)pyrrolidine A mixture of 5.0 g. (0.023 mole) of 3-(3-trifluoromethylphenyl)pyrrolidine, 4.6 g. (0.023 mole) of 1-chlorocarbonyl-1,2,3,4-tetrahydroquinoline and 12 g. of potassium carbonate in 100 ml. of dry benzene was stirred at room temperature 16 hours and refluxed one hour, cooled and filtered. The filtrate was concentrated and the residual oil was distilled at reduced pressure. The fraction which boiled at 185–187° C./.03 mm. was collected and weighed 5.6 g. (65% yield).

*Analysis.*—Calculated for $C_{21}H_{21}F_3N_2O$ (percent): C, 67.37; H, 5.65; N, 7.48. Found (percent): C, 67.42; H, 5.88; N, 7.30.

Example 18.—3-(3-trifluoromethylphenyl)-1-(5-chloroindolinylcarbonyl)pyrrolidine A mixture of 1.5 g. (0.0067 mole) of 3-(3-trifluoromethylphenyl)pyrrolidine, 1.5 g. (0.007 mole) of 5-chloro-1-chlorocarbonylindoline, 5 g. of potassium carbonate and 100 ml. of benzene was stirred 16 hours at room temperature and refluxed two hours. The reaction mixture was filtered and the filtrate was washed successively with 3 N hydrochloric acid, water, and dried over magnesium sulfate. The solvent was evaporated and the residual oil which solidified on cooling was recrystallized from an isooctane-isopropyl ether mixture yielding 0.8 g. (30%) of product melting at 115–117° C.

*Analysis.*—Calculated for $C_{20}H_{18}ClF_3N_2O$ (percent): C, 60.84; H, 4.60; N, 7.10. Found (percent): C, 61.30; H, 4.69; N, 7.06.

Example 19.—1-(N-methyl-N-phenylcarbamoyl)-3-(3-trifluoromethylphenyl)pyrrolidine A mixture of 2.6 g. (0.009 mole) of 3-(3-trifluoromethylphenyl)-1-chlorocarbonylpyrrolidine, 1.0 g. (0.008 mole) of N-methylaniline, 100 ml. of benzene and 50 ml. of pyridine was refluxed 16 hours. The reaction mixture was concentrated and the residual oil was dissolved in benzene and chromatographed on magnesium silicate, eluting with a benzene-acetone mixture. The light yellow oil obtained gave one spot on thin layer chromatography and weighed 1.6 g. (51% yield).

*Analysis.*—Calculated for $C_{19}H_{19}F_3N_2O$ (percent): C, 65.51; H, 5.50; N, 8.04. Found (percent): C, 65.61; H, 5.56; N, 7.88.

Example 20.—1-hydrazinocarbonyl-3-(3-trifluoromethylphenyl)pyrrolidine

To a stirred solution of 2.8 g. (0.054 mole) of hydrazine in 25 ml. of ethanol at 10° C. was added dropwise a solution of 3-(3-trifluoromethylphenyl)-1-chlorocarbonylpyrrolidine in 150 ml. of an ether-methylene chloride mixture. The reaction mixture was stirred 16 hours at room temperature and concentrated in vacuo. The residual oil was partitioned between chloroform and water, the chloroform layer was washed with water, dried over magnesium sulfate and the solvent was evaporated at reduced pressure. The residual oil which crystallized on standing was recrystallized from isooctane yielding 2.4 g. (51%) of product melting at 92–94° C.

*Analysis.*—Calculated for $C_{12}H_{14}F_3N_3O$ (percent): C, 60.84; H, 4.60; N, 7.10. Found (percent): C, 61.30; H, 4.69; N, 7.06.

Utilizing the procedures of Examples 7–20, the following compounds are prepared from the stated ingredients:

1-(diphenylcarbamoyl) - 3 - (4-methoxyphenyl)pyrrolidine is prepared from 3-(4-methoxyphenyl)-1-chlorocarbonylpyrrolidine and diphenylamine.

1-(N-ethylthiocarbamoyl) - 3 - (2,4-dimethylphenyl)pyrrolidine is prepared from 3-(2,4-dimethylphenyl)pyrrolidine and ethyl isothiocyanate.

1-(N-ethyl-N-phenylcarbamoyl) - 3 - (3-fluorophenyl)pyrrolidine is prepared from 3-(3-fluorophenyl)-1-chlorocarbonylpyrrolidine and N-ethylaniline.

1-(N-methylthiocarbamoyl) - 3 - (4-chlorophenyl)pyrrolidine is prepared from 3-(4-chlorophenyl)pyrrolidine and methyl isothiocyanate.

1-(N-butyl - N - phenylcarbamoyl) - 3 - (2,4-dichlorophenyl)pyrrolidine is prepared from 3 - (2,4 - dichlorophenyl)-1-chlorocarbonylpyrrolidine and N-butylaniline.

1-[N - propyl - N - (3-trifluoromethylphenyl)carbamoyl]-3-(3-trifluoromethylphenyl)pyrrolidine is prepared from 3-(3-trifluoromethylphenyl)-1-chlorocarbonylpyrrolidine and N-propyl-3-trifluoromethylaniline.

1-amino-3-(4-chlorophenyl)pyrrolidine is prepared by reacting 3-(4-chlorophenyl)pyrrolidine and sodium nitrite followed by reduction with lithium aluminum hydride.

Formulation and administration.—Useful compositions containing at least one of the compounds according to the invention in association with a pharmaceutical carrier or excipient may be prepared in accordance with conventional technology and procedures. Thus, the compounds may be presented in a form suitable for oral or parenteral administration. For example, compositions for oral administration can be solid or liquid and can take the form of capsules, tablets, coated tablets and suspensions, such compositions comprising carriers or excipients conveniently used in the pharmaceutical art. Suitable tableting excipients include lactose, potato, and maize starches, talc, gelatin, and stearic and silicic acids, magnesium stearate, and polyvinyl pyrrolidone.

For parenteral administration the carrier or excipient may be a sterile, parenterally acceptable liquid; e.g., water or a parenterally acceptable oil; e.g., arachis oil contained in ampules.

Advantageously, the compositions may be formulated as dosage units, each unit being adapted to supply a fixed dose of active ingredients. Tablets, capsules, coated tablets and ampules are examples of preferred dosage unit forms according to the invention. Although small quantities of the active materials of the present invention are effective when minor therapy is involved or in cases of administration to subjects having a relatively low body weight, unit dosages are usually five milligrams or above and preferably twenty-five, fifty or one hundred milligrams or even higher, depending of course upon the emergency of the situation and the particular result desired. Five to fifty milligrams appear to be optimum per unit dose, while usual broader ranges appear to be one to 500 milligrams per unit dose. It is only necessary that the active ingredient constitute an effective amount; i.e., such that a suitable effective dosage will be obtained consistent with the dosage form employed. Obviously, several unit dosage forms may be administered at about the same time.

The following are examples of compositions formed in accordance with this invention.

(1) Capsules.—Capsules of 5, 25, and 50 mg. of active ingredient per capsule are prepared. With the higher amounts of active ingredient, reduction may be made in the amount of lactose.

| Typical blend for encapsulation: | Per capsule, mg. |
|---|---|
| Active ingredient | 5.0 |
| Lactose | 296.7 |
| Starch | 129.0 |
| Magnesium stearate | 4.3 |
| Total | 435.0 |

(2) Tablets.—A typical formulation for a tablet containing 5 mg. of active ingredient per tablet follows. The formulation may be used for other strengths of active ingredient by adjustment of weight of dicalcium phosphate.

| | Per tablet, mg. |
|---|---|
| (1) Active ingredient | 5.0 |
| (2) Corn starch | 13.6 |
| (3) Corn starch (paste) | 3.4 |
| (4) Lactose | 79.2 |
| (5) Dicalcium phosphate | 68.2 |
| (6) Calcium stearate | 0.9 |
| Total | 170.3 |

Uniformly blend 1, 2, 4, and 5. Prepare 3 as a ten percent paste in water. Granulate the blend with starch paste and pass the wet mass through an eight-mesh screen. The wet granulation is dried and sized through a twelve-mesh screen. The dried granules are blended with the calcium stearate and compressed.

Additional tablet formulations preferably contain a higher dosage of the active ingredient and are as follows:

50 MG. TABLET

| Ingredients: | Per tablet, mg. |
|---|---|
| Active ingredient | 50.0 |
| Lactose | 90.0 |
| Milo starch | 20.0 |
| Corn starch | 38.0 |
| Calcium stearate | 2.0 |
| Total | 200.0 |

Uniformly blend the active ingredient, lactose, starches, and dicalcium phosphate when present. The blend is then granulated using water as a granulating medium. The wet granules are passed through an eight-mesh screen and dried at 140–160° Fahrenheit over night. The dried granules are passed through a ten-mesh screen, blended with the proper amount of calcium stearate, and the lubricated granules then converted into tablets on a suitable tablet press.

(3) Injectable—2% sterile solution:

| | Per cc. |
|---|---|
| Active ingredient mg. | 20 |
| Preservative, e.g., chlorobutanol, weight/volume percent | 0.5 |
| Water for injection q.s. | |

Prepare solution, clarify by filtration, fill into vials, seal, and autoclave.

Various modifications in the compounds, compositions and methods of the invention will be apparent to one skilled in the art and may be made without departing from the spirit or scope thereof, and it is therefore to be understood that the invention is to be limited only by the scope of the appended claims.

What is claimed:

1. A compound selected from (a) the group consisting of a member having the formula:

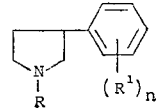

wherein;

R is selected from the group consisting of carbamoyl, N - phenylcarbamoyl, N,N - diphenylcarbamoyl, N-lower-alkyl-N-phenylcarbamoyl, N-lower-alkyl-thiocarbamoyl, $R^1$ is selected from the group consisting of lower alkyl, lower alkoxy, trifluoromethyl and halogen of atomic weight less than 80, n is a positive integer from 0–2 inclusive, and (b) acid addition salts thereof.

2. A compound as defined in claim 1 which is 1-(N-phenylcarbamoyl) - 3 - (3-trifluoromethylphenyl)pyrrolidine.

3. A compound as defined in claim 1 which is 1-(N-methylthiocarbamoyl) - 3 - (3 - trifluoromethylphenyl) pyrrolidine.

4. A compound as defined in claim 1 which is 1-carbamoyl-3-(3-trifluoromethylphenyl)pyrrolidine.

References Cited

Wagner et al.: Synthetic Organic Chemistry (1953), pp. 645–647.

ALEX MAZEL, Primary Examiner

J. A. NARCAVAGE, Assistant Examiner

U.S. Cl. X.R.

260 — 287 R, 326.13 R, 326.5 D, 326.5 L, 326.5 M, 326.5 R, 326.8, 326.83, 326.85, 326.86; 474—274

UNITED STATES PATENT OFFICE
CERTIFICATE OF CORRECTION

Patent No. 3,644,414           Dated Feb. 22, 1972

Inventor(s) Grover Cleveland Helsley

It is certified that error appears in the above-identified patent and that said Letters Patent are hereby corrected as shown below:

Column 1, line 51, delete the line in its entirety.
Column 3, lines 30-35, correct "R" to read --RZ-- in reaction of Formula IV to IV-a; lines 38-40, insert a double bond between the 3,4 carbon atoms of the pyrrolidine nucleus.
Column 5, line 19, change "pyrroldinie" to read --pyrrolidine--
Column 7, line 60, change "pyrroldine" to --pyrrolidine--; line 74, add --g.-- after 5.9. Column 8, line 9, change "17.07" to --17.70--; line 38, change "isopropanolisopropyl" to --isopropanol-isopropyl--.
Column 10, line 9, underline --in vacuo--.

Signed and sealed this 8th day of August 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,644,414      Dated February 22, 1972

Inventor(s) Grover Cleveland Helsley

It is certified that error appears in the above-identified patent and that said Letters Patent are hereby corrected as shown below:

The term of this patent subsequent to February 22, 1989, has been disclaimed.

Signed and sealed this 13th day of May 1975.

(SEAL)
Attest:

RUTH C. MASON
Attesting Officer

C. MARSHALL DANN
Commissioner of Patents
and Trademarks